(12) United States Patent
Asahara et al.

(10) Patent No.: US 11,914,950 B2
(45) Date of Patent: Feb. 27, 2024

(54) REPORT WRITING SUPPORT SYSTEM AND REPORT WRITING SUPPORT METHOD

(71) Applicant: Hitachi, Ltd., Tokyo (JP)

(72) Inventors: Akinori Asahara, Tokyo (JP); Takuya Kanazawa, Tokyo (JP); Hidekazu Morita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/909,007

(22) PCT Filed: Jan. 20, 2021

(86) PCT No.: PCT/JP2021/001922
§ 371 (c)(1),
(2) Date: Sep. 2, 2022

(87) PCT Pub. No.: WO2021/192556
PCT Pub. Date: Sep. 30, 2021

(65) Prior Publication Data
US 2023/0066125 A1 Mar. 2, 2023

(30) Foreign Application Priority Data
Mar. 25, 2020 (JP) .................................. 2020-053666

(51) Int. Cl.
*G06F 40/186* (2020.01)
(52) U.S. Cl.
CPC .................................. *G06F 40/186* (2020.01)
(58) Field of Classification Search
CPC .. G06F 40/186; G06Q 10/10; G06Q 30/0203; G06Q 50/10
See application file for complete search history.

(56) References Cited

U.S. PATENT DOCUMENTS 7,340,675 B1 * 3/2008 Hancock ............... G06F 40/186
709/204
7,861,161 B1 * 12/2010 Bedell .................. G06F 16/838
715/255

(Continued)

FOREIGN PATENT DOCUMENTS

CN 1689009 A * 10/2005 ......... G06F 17/2235
JP 2004-102818 A 4/2004

(Continued)

OTHER PUBLICATIONS

International Search Report of PCT/JP2021/001922 dated Apr. 27, 2021.

*Primary Examiner* — Hassan Mrabi
(74) *Attorney, Agent, or Firm* — Mattingly & Malur, PC

(57) ABSTRACT

Provided is a report writing support system including: a document model determination unit that determines a document model storing a template of a draft to be presented to a user, on the basis of an answer to a selective question and a question determination model that determines a further question to the answer; a template application unit that asks a descriptive question for asking a question about a content lacking in the template of the draft stored in the document model on the basis of the determined document model and the answer or a further answer, and applies an answer to the descriptive question to the template of the draft; and a presentation processing unit that presents the template of the draft, to which the answer to the descriptive question is applied, as a draft to be presented to the user.

7 Claims, 22 Drawing Sheets

(56) References Cited

U.S. PATENT DOCUMENTS

| | | | |
|---|---|---|---|
| 2005/0278623 A1 | 12/2005 | Dehlinger et al. | |
| 2006/0282396 A1* | 12/2006 | Newman | G06Q 50/188 |
| | | | 705/80 |
| 2007/0214096 A1* | 9/2007 | Newman | G06Q 10/10 |
| | | | 705/400 |
| 2008/0250102 A1 | 10/2008 | Anei et al. | |
| 2017/0031891 A1* | 2/2017 | Polega | G06F 40/186 |
| 2019/0042554 A1 | 2/2019 | Aylett et al. | |
| 2020/0341619 A1* | 10/2020 | Rogers | G06F 8/71 |
| 2022/0198136 A1* | 6/2022 | Peleg | G06F 40/186 |

FOREIGN PATENT DOCUMENTS

| | | | | |
|---|---|---|---|---|
| JP | 2008-257569 A | 10/2008 | | |
| JP | 2008-262432 A | 10/2008 | | |
| JP | 2008-269041 A | 11/2008 | | |
| JP | 5890078 B1 * | 3/2016 | | G06Q 50/10 |
| JP | 2020-21302 A | 2/2020 | | |
| WO | WO-0206954 A1 * | 1/2002 | | G06Q 10/10 |
| WO | WO-2021002585 A1 * | 1/2021 | | G06F 16/3329 |
| WO | WO-2021100989 A1 * | 5/2021 | | G06F 3/04847 |

\* cited by examiner

FIG. 3
1. INITIAL PHASE
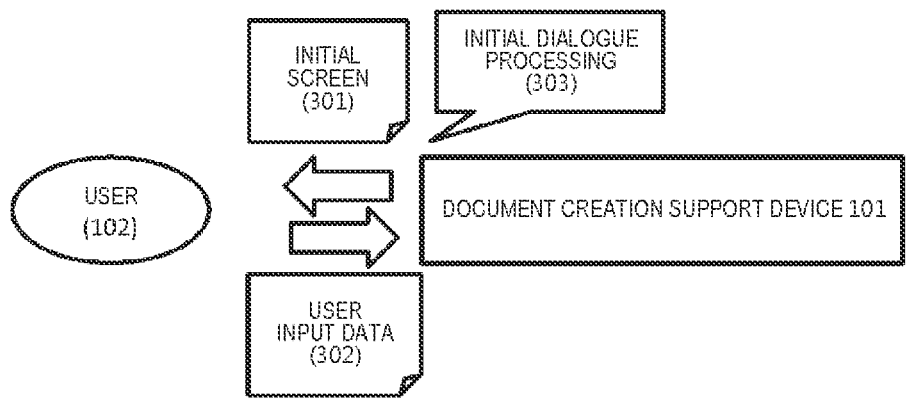
2. DOCUMENT INFORMATION COLLECTION PHASE
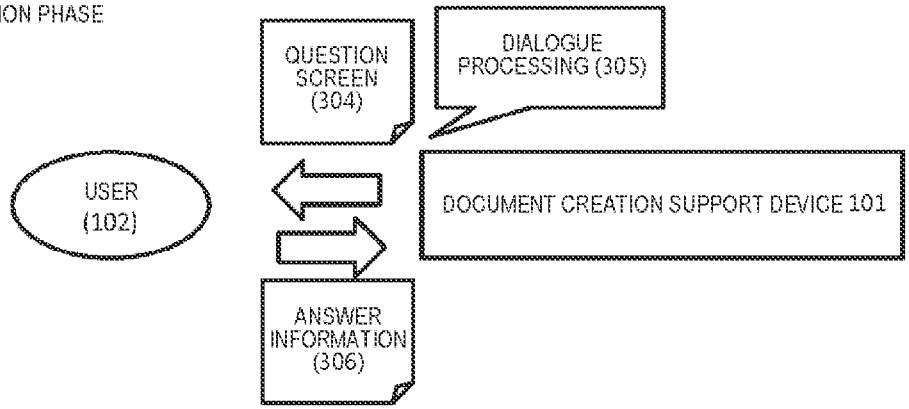
3. DRAFT VIEWING PHASE
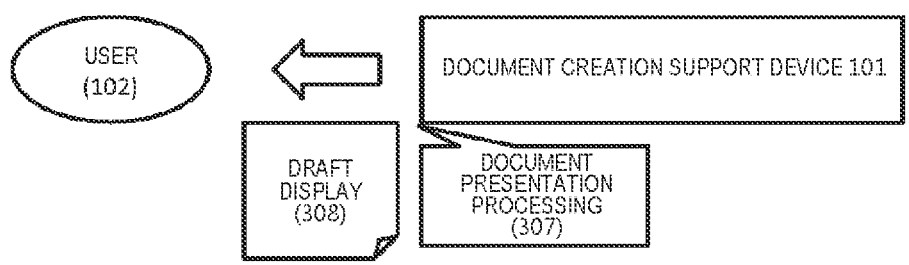

INITIAL SCREEN (301)

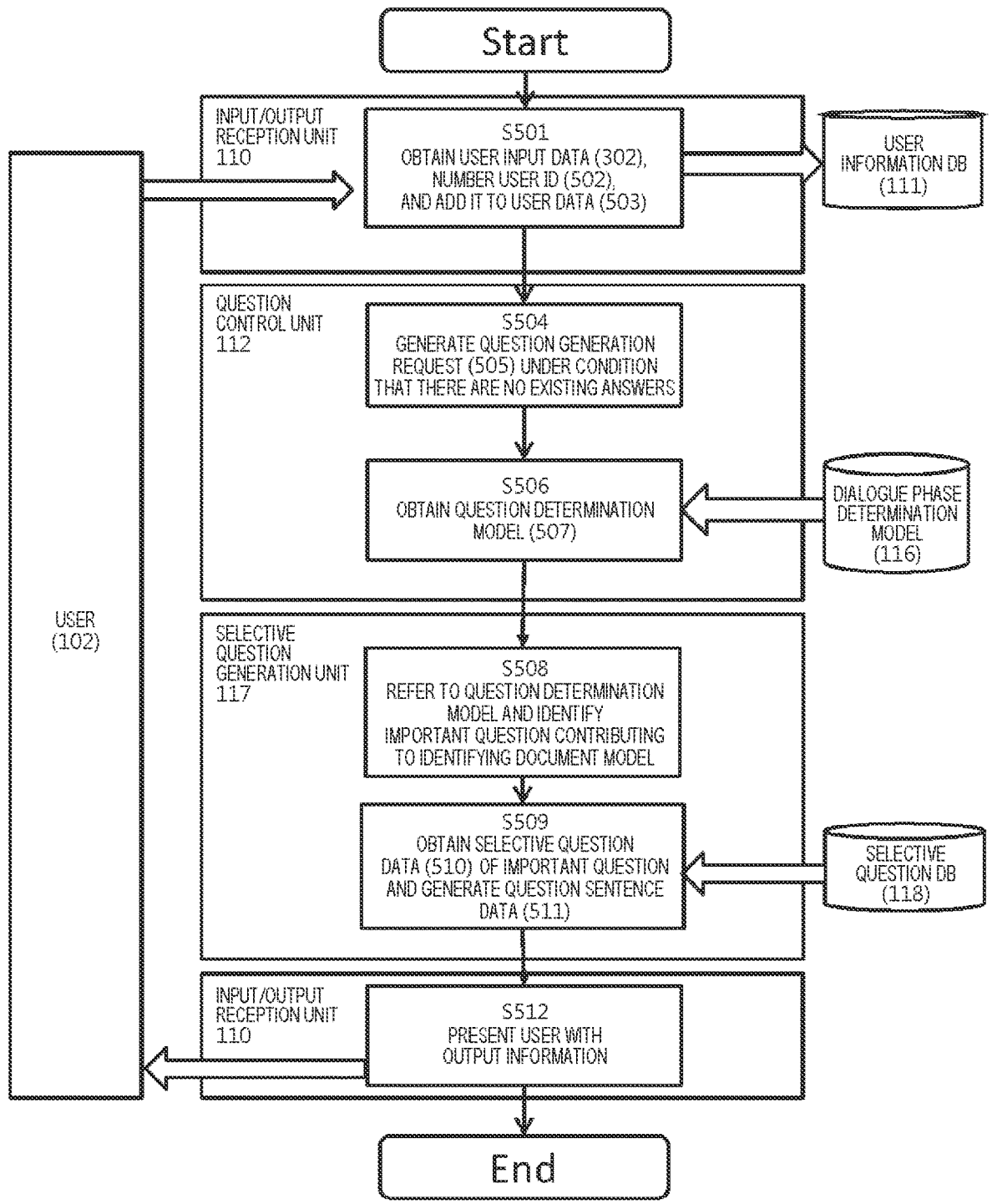

FIG. 6

USER INPUT DATA (302) PASSED FROM USER

| ITEM NAME | CONTENT |
|---|---|
| USER ID (601) | ID FOR IDENTIFYING USER, BLANK WHEN UNDECIDED |
| USER NAME (602) | STRING REPRESENTING NAME OF USER |

FIG. 7

USER DATA (503) OF USER INFORMATION DB (111)

| ITEM NAME | CONTENT |
|---|---|
| USER ID (701) | ID FOR IDENTIFYING USER |
| USER NAME (702) | STRING REPRESENTING NAME OF USER |
| DIALOGUE PHASE (703) | CODE VALUE INDICATING ONE OF DOCUMENT MODEL IDENTIFICATION PHASE, DOCUMENT INFORMATION COLLECTION PHASE, AND DRAFT VIEWING PHASE |
| DOCUMENT MODEL ID (704) | ID OF DOCUMENT MODEL IS STORED WHEN DOCUMENT MODEL HAS BEEN IDENTIFIED. BLANK OTHERWISE. |

FIG. 8

QUESTION GENERATION REQUEST (505)

| ITEM NAME | CONTENT |
|---|---|
| USER ID (801) | ID FOR IDENTIFYING USER |
| USER NAME (802) | STRING REPRESENTING NAME OF USER |
| ANSWER HISTORY DATA (803) | ARRAY DATA OF PAIR OF QUESTION ID AND ANSWER VALUE |

FIG. 9

SELECTIVE QUESTION DATA (510) OF SELECTIVE QUESTION DB

| ITEM NAME | CONTENT |
|---|---|
| QUESTION ID (901) | IDENTIFIER OF QUESTION |
| QUESTION SENTENCE (902) | QUESTION SENTENCE TO BE PRESENTED TO USER |
| OPTION LIST (903) | STRING OF OPTION AND CODE VALUE CORRESPONDING TO THE STRING |

FIG. 10

QUESTION DETERMINATION MODEL (507) OF DIALOGUE PHASE DETERMINATION MODEL (116)

| ITEM NAME | | CONTENT |
|---|---|---|
| BRANCH 1 (1001) | BRANCH ID (1004) | IDENTIFIER OF THE BRANCH |
| | QUESTION ID (1005) | QUESTION ID CORRESPONDING TO BRANCH |
| | ANSWER SPECIFIC DESTINATION (1006) | LIST OF BRANCH IDS FOR EACH ANSWER |
| BRANCH 2 (1002) | BRANCH ID | IDENTIFIER OF THE BRANCH |
| | QUESTION ID | QUESTION ID CORRESPONDING TO BRANCH |
| | ANSWER SPECIFIC DESTINATION | LIST OF BRANCH IDS FOR EACH ANSWER |
| ... | | ... |
| RESULT 1 (1003) | BRANCH ID (1007) | IDENTIFIER OF THE BRANCH |
| | DOCUMENT MODEL ID (1008) | DOCUMENT MODEL ID CORRESPONDING TO THIS RESULT |
| ... | | ... |

FIG. 12

QUESTION SENTENCE DATA (511)

| ITEM NAME | CONTENT |
|---|---|
| USER ID (1201) | ID FOR IDENTIFYING USER |
| QUESTION ID (1202) | IDENTIFIER OF QUESTION |
| QUESTION TYPE (1203) | CODE VALUE INDICATING ONE OF SELECTIVE QUESTION AND DESCRIPTIVE QUESTION |
| QUESTION SENTENCE (1204) | TEXT OF QUESTION SENTENCE |
| ANSWER INFORMATION (1205) | FOR SELECTIVE QUESTION, COLUMN OF OPTIONS AND OPTION CODE VALUES INDICATING EACH OPTION. FOR DESCRIPTIVE QUESTION, NAME OF ITEM FOR WHICH ANSWER IS REQUESTED |

FIG. 13

QUESTION SCREEN (304) ON SELECTIVE QUESTION

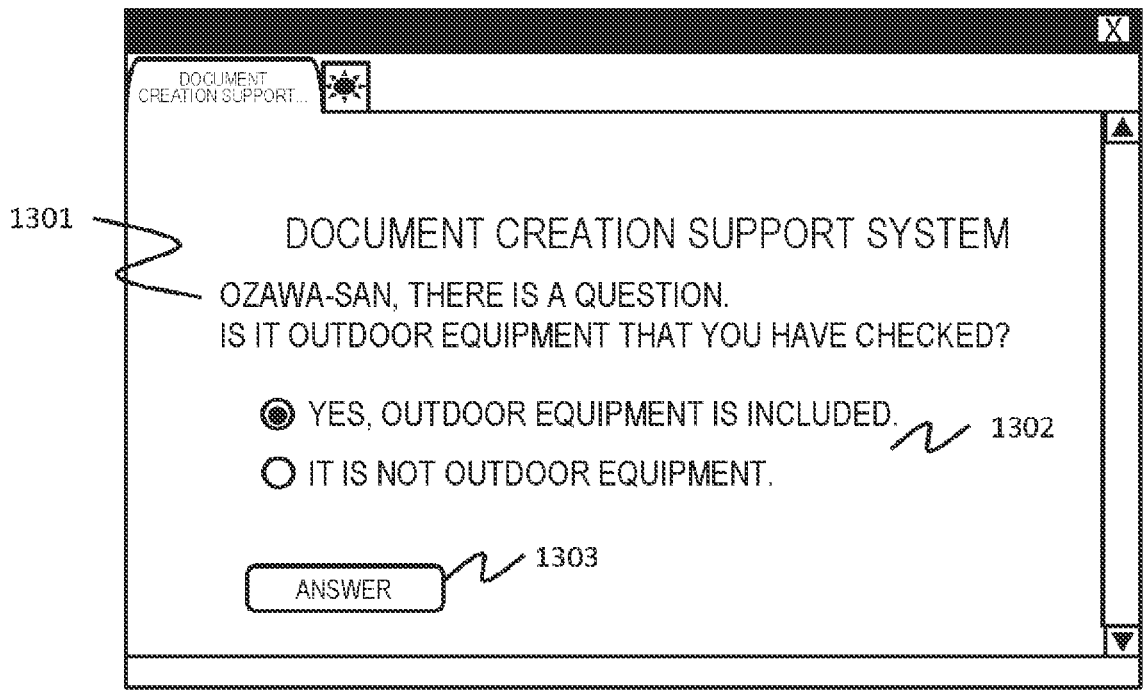

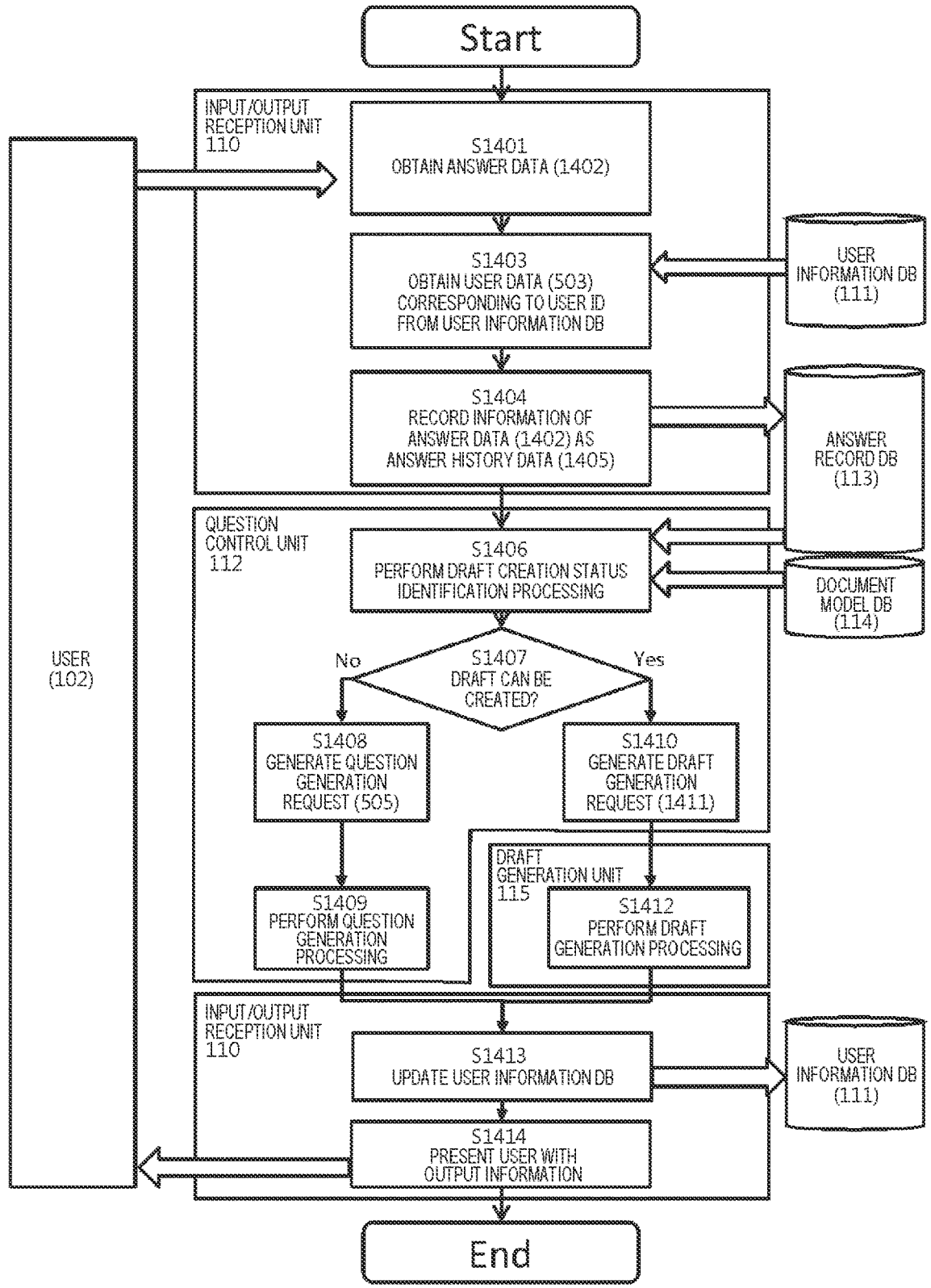

FIG. 15

ANSWER DATA (1402)

| ITEM NAME | CONTENT |
|---|---|
| USER ID (1501) | ID FOR IDENTIFYING USER |
| QUESTION ID (1502) | IDENTIFIER OF QUESTION |
| QUESTION TYPE (1503) | CODE VALUE INDICATING ONE OF SELECTIVE QUESTION AND DESCRIPTIVE QUESTION |
| ANSWER CONTENT (1504) | FOR SELECTIVE QUESTION, OPTION CODE VALUE. FOR DESCRIPTIVE QUESTION, STRING OF ANSWER |

FIG. 16

ANSWER HISTORY DATA (1405)

| ITEM NAME | CONTENT |
|---|---|
| USER ID (1601) | ID FOR IDENTIFYING USER |
| QUESTION ID (1602) | IDENTIFIER OF QUESTION |
| QUESTION TYPE (1603) | CODE VALUE INDICATING ONE OF SELECTIVE QUESTION AND DESCRIPTIVE QUESTION |
| ANSWER CONTENT (1604) | FOR SELECTIVE QUESTION, OPTION CODE VALUE. FOR DESCRIPTIVE QUESTION, STRING OF ANSWER |

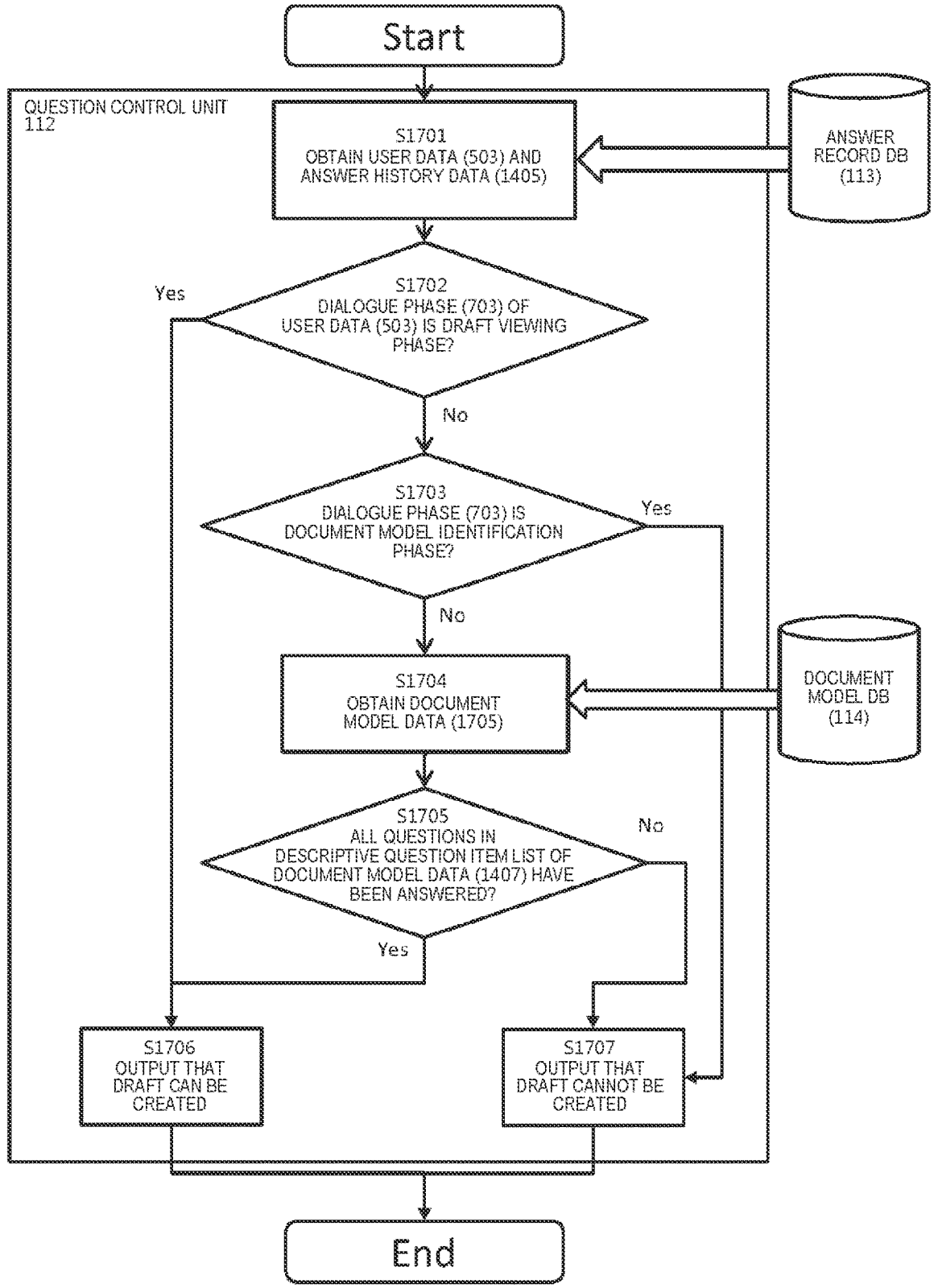

FIG. 18

DOCUMENT MODEL DATA (1705) OF DOCUMENT MODEL DB (505)

| ITEM NAME | CONTENT |
|---|---|
| DOCUMENT MODEL ID (1801) | IDENTIFIER FOR IDENTIFYING TYPE OF DOCUMENT |
| DRAFT TEMPLATE (1802) | TEMPLATE OF DRAFT, IN KEYWORD REPLACEMENT PART, QUESTION ID ENCLOSED IN CURLY BRACES {} IS DESCRIBED |
| DESCRIPTIVE QUESTION ITEM LIST (1803) | LIST OF QUESTION ID CORRESPONDING TO KEYWORD |

FIG. 19

EXAMPLE OF DOCUMENT MODEL DATA

| DOCUMENT MODEL ID (1901) | DRAFT TEMPLATE (1902) | DESCRIPTIVE QUESTION ITEM LIST (1903) |
|---|---|---|
| 1 | SURVEY NAME: {1}<br>THIS SURVEY IS TO DETERMINE ADOPTION OR REJECTION OF NEW TECHNOLOGY IN NEXT PRODUCT {13} BY QUANTITATIVE EVALUATION OF {2}. ... | {1,2,13} |
| 2 | SURVEY NAME: {1}<br>THIS SURVEY IS TO DETERMINE APPLICABILITY OF<br>NEW TECHNOLOGY TO<br>NEXT PRODUCT {13} BY<br>INVESTIGATING BEHAVIOR<br>OF {2}. ... | {1,2,13} |
| 3 | SURVEY NAME: {1}<br>THIS SURVEY IS TO EXAMINE RELATIONSHIP OF<br>NEW TECHNOLOGY RELATED TO {3} WITH CURRENT PRODUCT {14}. ... | {1,3,14} |
| ... | ... | ... |

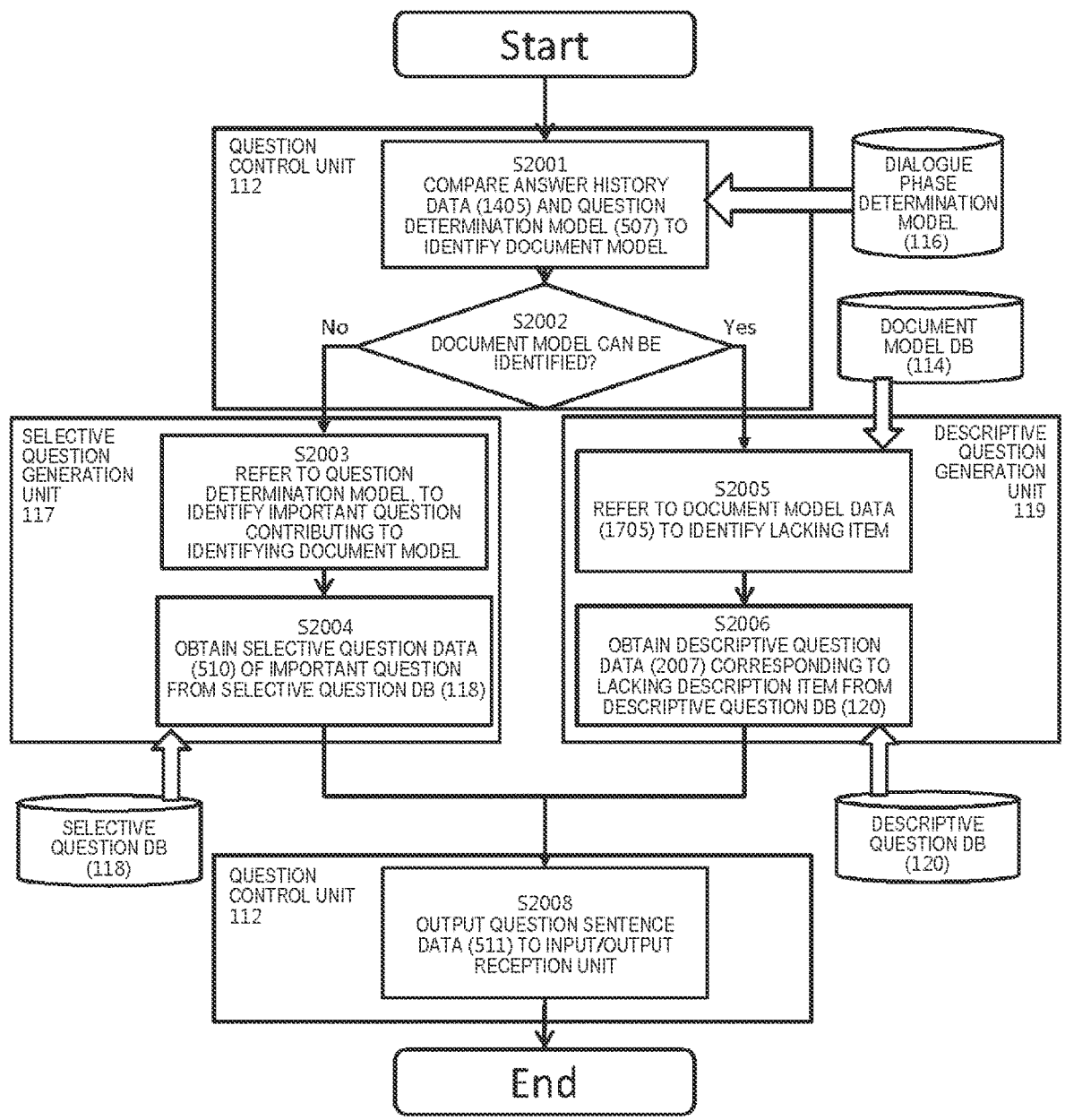

DESCRIPTIVE QUESTION DATA (2007) OF DESCRIPTIVE QUESTION DB

| ITEM NAME | CONTENT |
|---|---|
| QUESTION ID (2101) | CORRESPOND TO IDENTIFIER OF QUESTION AND QUESTION ID (901) OF QUESTION SENTENCE DATA (506) |
| QUESTION SENTENCE (2102) | QUESTION SENTENCE TO BE PRESENTED TO USER |
| ANSWER ITEM NAME (2103) | NAME OF ITEM FOR WHICH ANSWER IS REQUESTED |

QUESTION SCREEN (304) ON DESCRIPTIVE QUESTION

DRAFT GENERATION REQUEST (1411)

| ITEM NAME | CONTENT |
|---|---|
| USER ID (2301) | ID FOR IDENTIFYING USER |
| USER NAME (2302) | STRING REPRESENTING NAME OF USER |
| DOCUMENT MODE ID (2303) | IDENTIFIER FOR IDENTIFYING TYPE OF DOCUMENT |

DRAFT GENERATION PROCESSING (S1412)

DRAFT DATA (2404)

| ITEM NAME | CONTENT |
|---|---|
| USER ID (2501) | ID FOR IDENTIFYING USER |
| USER NAME (2502) | STRING REPRESENTING NAME OF USER |
| DRAFT TEXT (2503) | TEXT OF GENERATED DRAFT |

DRAFT DISPLAY (312)

*FIG. 28*

QUESTION DETERMINATION MODEL (507) OF DIALOGUE PHASE DETERMINATION MODEL (116)

| ITEM NAME | | CONTENT |
|---|---|---|
| BRANCH 1 (901) | BRANCH ID (904) | IDENTIFIER OF THE BRANCH |
| | QUESTION ID (905) | QUESTION ID CORRESPONDING TO BRANCH |
| | ANSWER SPECIFIC DESTINATION (906) | LIST OF BRANCH IDS FOR EACH ANSWER |
| BRANCH 2 (902) | BRANCH ID | IDENTIFIER OF THE BRANCH |
| | QUESTION ID | QUESTION ID CORRESPONDING TO BRANCH |
| | ANSWER SPECIFIC DESTINATION | LIST OF BRANCH IDS FOR EACH ANSWER |
| ... | | ... |
| RESULT 1 (903) | BRANCH ID (907) | IDENTIFIER OF THE BRANCH |
| | QUESTION ID (2801) | QUESTION ID CORRESPONDING TO THIS CONDITION |
| | DOCUMENT MODEL ID (2802) | DOCUMENT MODEL ID CORRESPONDING TO THIS RESULT |
| | COUNT (2803) | NUMBER OF TIMES THIS BRANCH HAS BEEN SELECTED |
| | QUESTION ID | QUESTION ID CORRESPONDING TO THIS CONDITION |
| | DOCUMENT MODEL ID | DOCUMENT MODEL ID CORRESPONDING TO THIS RESULT |
| | COUNT | NUMBER OF TIMES THIS BRANCH HAS BEEN SELECTED |
| | ... | |
| ... | | ... |

FIG. 29
SCHEMATIC DIAGRAM OF DIALOGUE PHASE DETERMINATION
2903
| # | QUESTION ID | | | | | | | | DOCUMENT MODEL ID |
|---|---|---|---|---|---|---|---|---|---|
| | 1 | 2 | 3 | 4 | 5 | 6 | 7 | 8 | |
| 1 | 1 | 1 | 1 | 3 | 1 | 2 | 1 | 2 | 3 |
| 2 | 1 | 2 | 1 | 1 | 2 | 1 | 2 | 2 | 4 |
| 3 | 2 | 1 | 2 | 2 | 2 | 1 | 2 | 2 | 1 |
| | ... | ... | ... | ... | ... | ... | ... | ... | ... |
LEARNING ALGORITHM
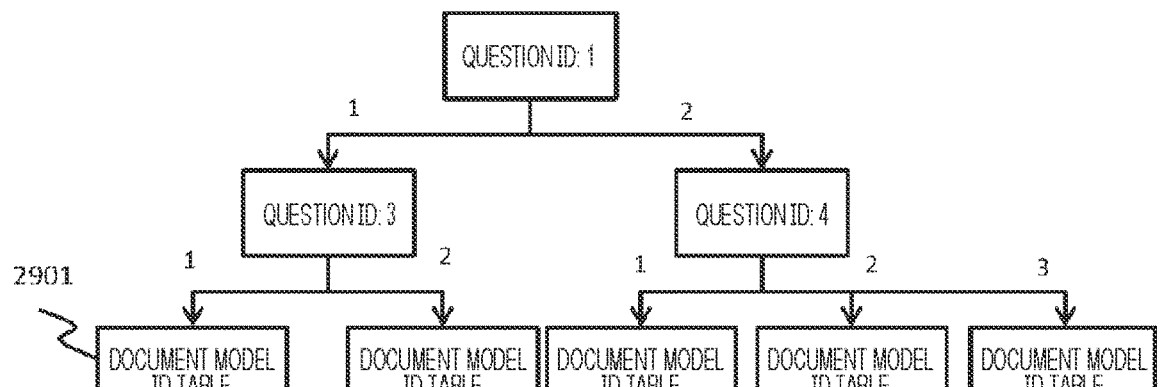
2901
2902
| QUESTION ID | DOCUMENT MODEL ID | COUNT |
|---|---|---|
| 101 | 1 | 10 |
| 102 | 2 | 22 |
| 103 | 3 | 19 |
| ... | ... | ... |

FIG. 31 FLOW OF DIALOGUE PROCESSING (305) OF SECOND EMBODIMENT
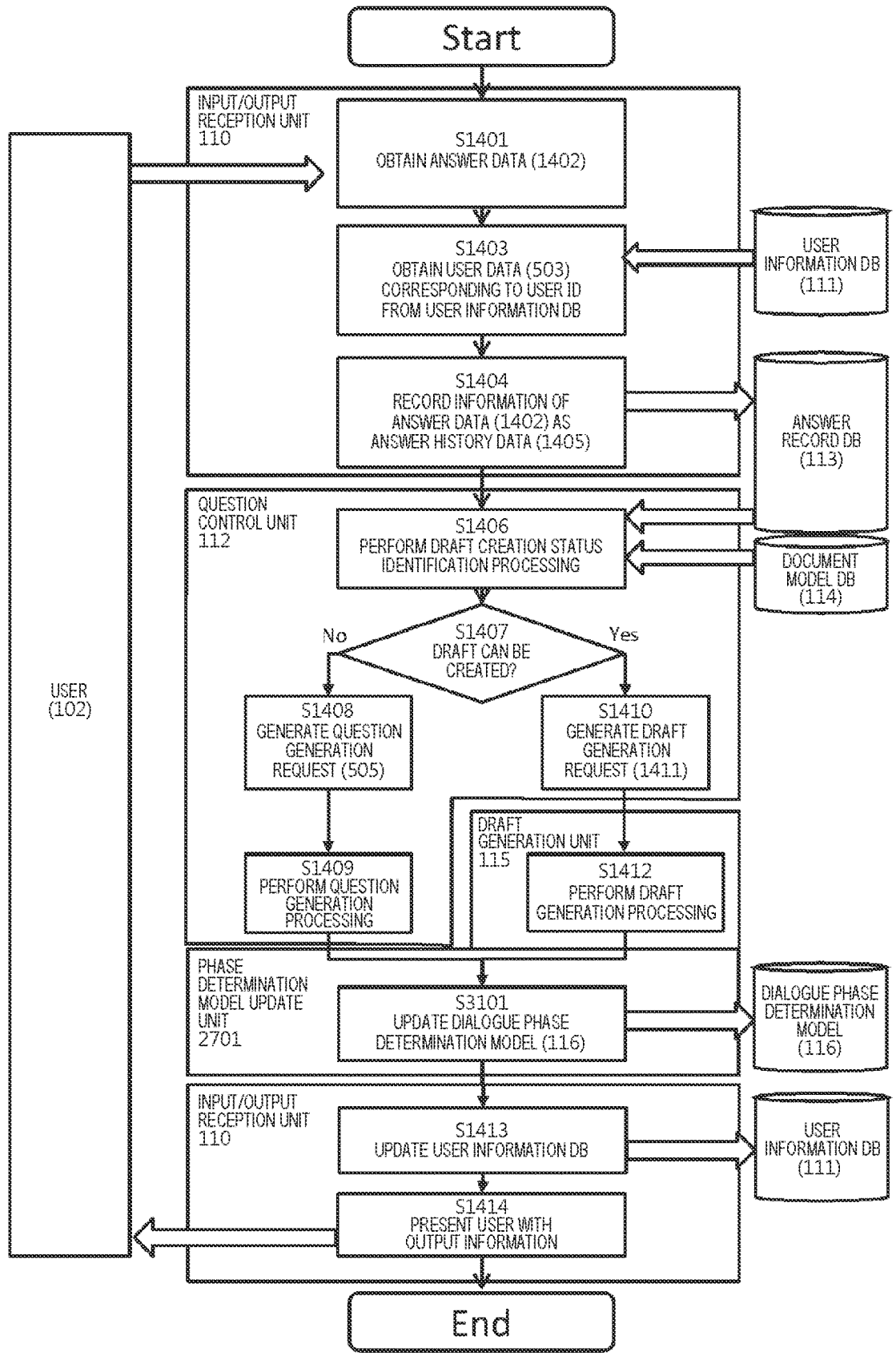

REPORT WRITING SUPPORT SYSTEM AND REPORT WRITING SUPPORT METHOD

TECHNICAL FIELD

The present invention relates to a report writing support system and a report writing support method for supporting report writing.

BACKGROUND ART

In various research and development and investigations, it is possible to obtain facts and empirical rules confirmed by workers. Such implicit knowledge is extremely valuable information for an employer who employs the workers, and it is desirable to share the implicit knowledge with many employees without being limited to the workers. For this purpose, measures are often taken to create and share reports and the like. However, in writing the report, quality of information transmission varies depending on writing skills of an author. That is, it is not easy to acquire the writing skills to convey information without excess or deficiency to a reader, which causes omission of transmission and occurrence of misunderstanding.

In addition, as another problem, there is also a problem of labor required for writing. Generally, it is difficult and time-consuming to write a report from a blank state. Therefore, a template of the report is prepared in advance, and writing work is often performed according to the template. However, only a small number of patterns of the template can be used in this method. This is because when there are too many templates, a user cannot determine which template should be selected from templates. Therefore, it is common to prepare several templates for each of fields. For example, a template of a report of an experiment may be prepared, but it is not possible to take detailed measures such as using different templates depending on the contents and results of the experiment. A method such as document search can be applied if a specific template is just selected from a large number of templates, but it is necessary for the user to sufficiently grasp prepared templates and to determine which template is to be used by the user itself, which is very difficult.

CITATION LIST

Patent Literatures

PTL 1: JP 2008-262432 A
PTL 2: JP 2004-102818 A

SUMMARY OF INVENTION

Technical Problem

PTL 1 discloses a technique for generating a report by inputting near-miss incidents into a form and applying the incidents to a template. However, in this method, it is not possible to select and use an appropriate template from various types of templates, and it is not possible to use the template unless the content to be reported is clarified.

PTL 2 discloses a technique of easily preparing answer data to a question by searching for a question sentence with a conceptual keyword. According to this method, a template can be conceptually searched, but it is not easy because the user still needs to identify a template to be used by itself.

The present invention has been made in view of such a situation, and an object of the present invention is to provide a report writing support system and a report writing support method capable of easily reflecting information that is only in a memory of the user in a document without much effort.

Solution to Problem

A report writing support system according to an aspect of the present invention is configured as a report writing support system including: a document model determination unit that determines a document model storing a template of a draft to be presented to a user, on the basis of an answer to a selective question and a question determination model that determines a further question to the answer; a template application unit that asks a descriptive question for asking a question about a content lacking in the template of the draft stored in the document model on the basis of the determined document model and the answer or an answer to the further question, and applies an answer to the descriptive question to the template of the draft; and a presentation processing unit that presents the template of the draft, to which the answer to the descriptive question is applied, as a draft to be presented to the user.

Advantageous Effects of Invention

According to one aspect of the present invention, the information that is only in the memory of the user can be easily reflected in the document without much effort.

BRIEF DESCRIPTION OF DRAWINGS

FIG. 3 is an example of a usage procedure of the first embodiment.

FIG. 5 is an example of an initial dialogue flow of the first embodiment.

FIG. 6 is an example of user input data passed from a user of the first embodiment.

FIG. 7 is an example of user data of a user information DB of the first embodiment.

FIG. 8 is an example of a question generation request of the first embodiment.

FIG. 9 is an example of selective question data of a selective question DB of the first embodiment.

FIG. 10 is an example of a question determination model of a dialogue phase determination model of the first embodiment.

FIG. 12 is an example of question sentence data of the first embodiment.

FIG. 13 is an example of a question screen on a selective question of the first embodiment.

FIG. 14 is an example of a flow of dialogue processing of the first embodiment.

FIG. 15 is an example of answer data of the first embodiment.

FIG. 16 is an example of answer history data of the first embodiment.

FIG. 17 is an example of a draft creation status identification processing by a question control unit of the first embodiment.

FIG. 18 is an example of document model data of a document model DB of the first embodiment.

FIG. 19 is an example of the document model data of the first embodiment.

FIG. 20 is an example of question generation processing of the first embodiment.

FIG. 28 is an example of the question determination model of the second embodiment.

FIG. 29 is a schematic diagram of a dialogue determination phase of the second embodiment.

FIG. 31 is an example of dialogue processing of the second embodiment.

DESCRIPTION OF EMBODIMENTS

First Embodiment

Figure 1:
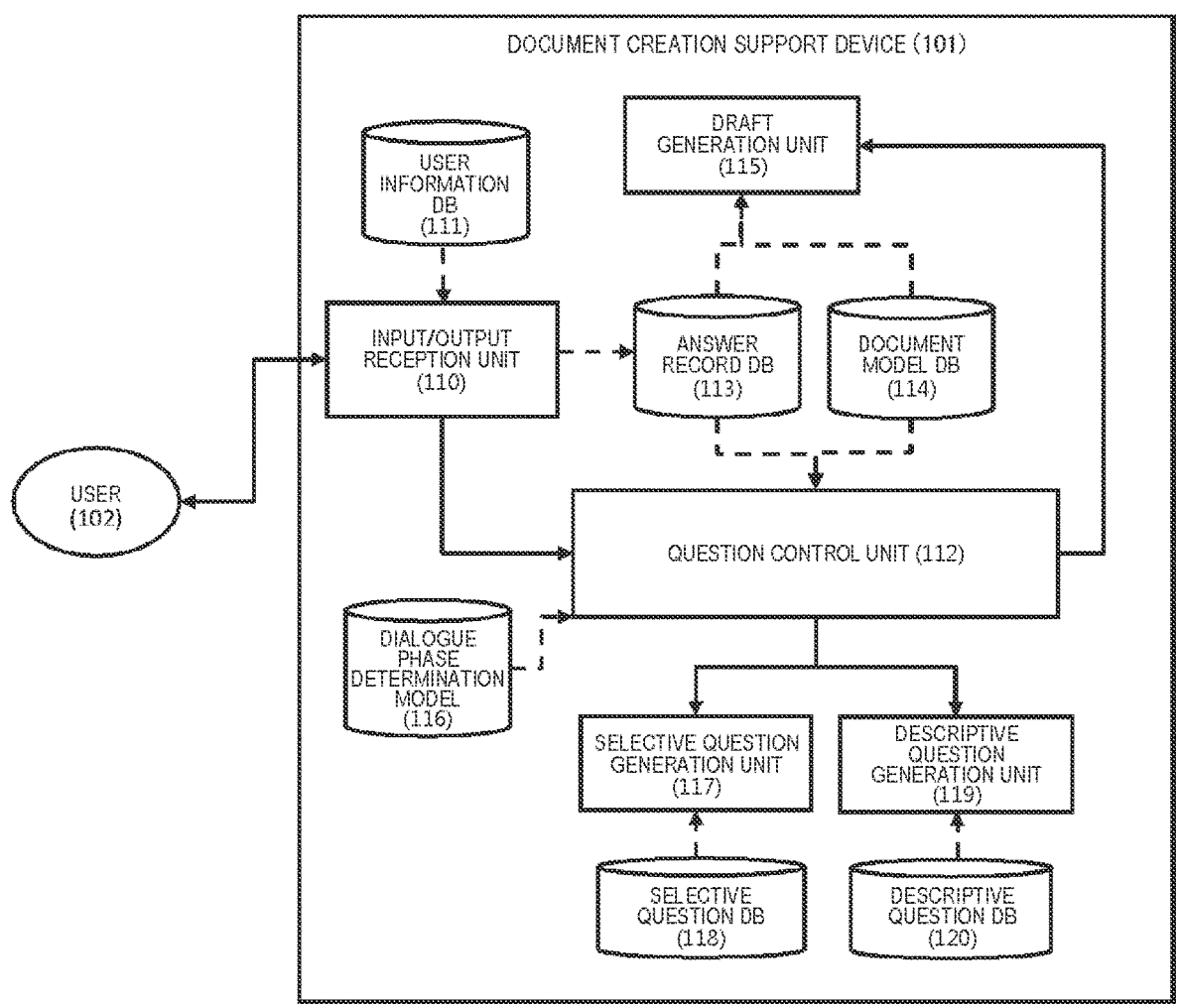
FIG. 1 is a schematic configuration example of a first embodiment.

FIG. 1 illustrates a configuration of a first embodiment of a document creation support device that is an example of a report writing support system and a report writing support method according to the present invention. A document creation support device (101) of the present embodiment is a device that receives an operation of a user (102), and is a system including an input/output reception unit (110) that receives an input from the user, a user information DB (111) that records a usage status of the user, a question control unit (112) that controls an overall flow of draft generation, an answer record DB (113) that stores an answer obtained from the user in a process of generating a draft, a document model DB (114) that manages information on a type of a document to be generated and a draft template of the document in association with each other, a draft generation unit (115) that generates the draft by combining information of the answer record DB (113) and the document model DB (114), a dialogue phase determination model (116) that holds information for identifying a document model and evaluating a degree of identifying the document, a selective question generation unit (117) that generates a selective question for identifying a dialogue phase, a selective question DB (118) that holds a template of the selective question, a descriptive question generation unit (119) that generates a descriptive question, and a descriptive question DB (120) that holds a template of the descriptive question to be generated by the descriptive question generation unit (119). Note that in the figure, solid arrows indicate flow of processing, and broken arrows indicate flow of data.

Figure 2:
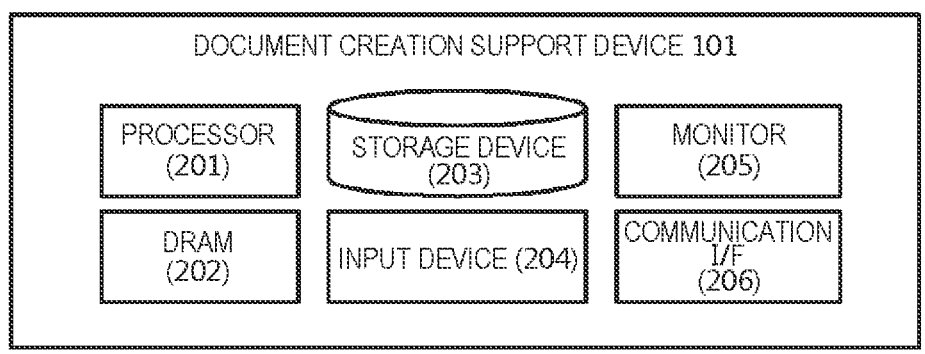
FIG. 2 is a configuration example of physical implementation of the first embodiment.

FIG. 2 is a configuration example of physical implementation of the first embodiment. The document creation support device (101) can be implemented using a general computer. That is, the document creation support device is a device including a processor (201) having computing power, a DRAM (202) that is a volatile temporary storage area capable of being read and written at a high speed, a storage device (203) that is a permanent storage area using an HDD, a flash memory, or the like, an input device (204) such as a mouse or a keyboard for performing the operation, a monitor (205) for indicating an operation to the user, and an interface (206) such as a serial port for communicating with an external computer or device. The input/output reception unit (110), the question control unit (112), the draft generation unit (115), the selective question generation unit (117), and the descriptive question generation unit (119) can be implemented by the processor (201) executing a program recorded in the storage device (203). The user information DB (111), the answer record DB (113), the document model DB (114), the dialogue phase determination model (116), the selective question DB (118), and the descriptive question DB (120) can be implemented by the processor (201) executing a program for accumulating data in a storage device (213). Hereinafter, units of the report writing support system are provided in the document creation support device (101) that is a general computer as hardware, but all or some of them may be provided in a distributed manner in one or a plurality of computers such as cloud and communicate with each other to implement similar functions.

FIG. 3 schematically illustrates an operation procedure of the present embodiment. When activated, the document creation support device (101) presents an initial screen (301) and waits for access from the user (102). When the user (102) inputs and passes user input data (302) to the document creation support device (101), the document creation support device (101) performs initial dialogue processing (303) to start a dialogue with the user. This initial procedure is referred to as an initial phase.

When the initial phase ends, the document creation support device (101) enters a document information collection phase in which information on a document to be created is collected while dialoguing with the user. In this phase, a question to be asked next in dialogue processing (305) performed by the document creation support device (101) is determined and presented to the user (102) as a question screen (304). When the user (102) inputs and sends answer information (306) in a form of an answer to the question, the dialogue processing (305) is performed again to generate a next question. By repeating this, the document to be created by the user (102) is gradually clarified.

When the draft of the document to be written by the user can be sufficiently generated, an operation of the document creation support device (101) enters a draft viewing phase for presenting the draft to the user. In the draft viewing phase, a result returned by the document creation support device (101) is subjected to draft presentation processing (307) including a created draft, and the draft presented to the user is a draft display (308) in which the draft is displayed in an easily viewable manner. Through this procedure, the user can passively create the draft of the document in response to a question from the document creation support device (101), and thus it is possible to reduce the effort required for creating the document from a blank state. Hereinafter, each of the phases will be described in detail.

Figure 4:
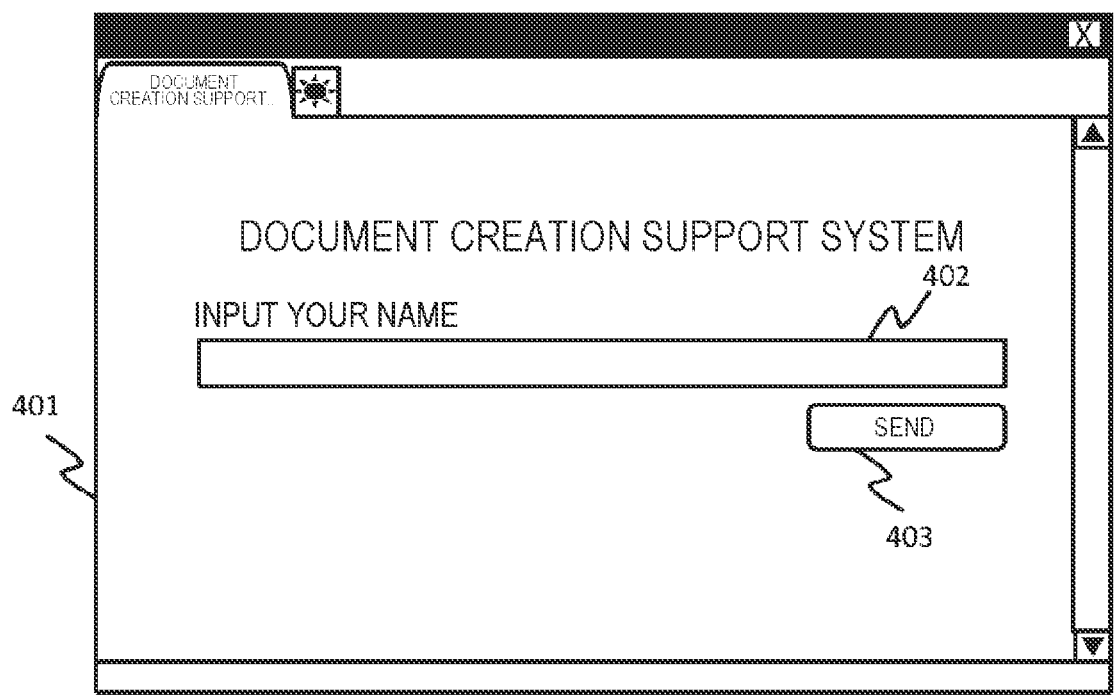
FIG. 4 is an example of an initial screen of the first embodiment.

FIG. 4 illustrates an example of the initial screen (301) generated when the document creation support device (101) is activated. The initial screen (301) is a screen for identifying information of the user. In this example, HTML data that can be generated by a known web browser (401) or the like is sent as the initial screen. This screen includes a text box (402) for obtaining name of the user and a send button (403) for completing the input and suggesting the start of use, and the user (102) can freely use one's own name, nickname, or the like. Note that the initial screen (301) may be any output format as long as it can be handled by the user (102), and may be in a form of voice interaction using, for example, a speaker or a microphone.

When the user (102) performs an operation on the initial screen (301) and presses the send button (403), the user input data (302) is sent to the document creation support device (101), and the document creation support device (101) performs the initial dialogue processing (303). FIG. 5 illustrates an example of a flow of the initial dialogue processing (303). In the initial dialogue processing (303), first, the input/output reception unit (110) receives the user input data (302) and performs processing of reflecting the user input data in the user information DB (111) (S501).

FIG. 6 illustrates an example of a content of the user input data (302). The user input data (302) includes a user ID (601) that is an ID for identifying the user, and a user name (602) indicating a display name of the user. Here, the user ID (601) may be blank when it is undecided, or may use information (for example, an employee number) that is separately designated and can identify the user. The user name (602) is obtained from the text box of the initial screen (301).

The user input data (302) is added to user data (503) of the user DB (111). FIG. 7 illustrates details of an example of the user data (503). The user data (503) includes a user ID (701) storing information of the user input data (302), a user name (702), data (703) of the dialogue phase indicating which phase the user is currently in, and a document model ID (704) indicating an estimation result of the type of the document that the user (102) is going to write. For the user ID (701), when the user ID (601) of the user input data (302) is blank, the input/output reception unit (110) issues a number that is not in the user ID (701) of the existing user data (503). For example, a value obtained by adding 1 to a maximum value of the user ID (701) can be used. Furthermore, in the initial dialogue processing (303), the dialogue phase (703) is a document model identification phase, and a value corresponding to the phase is stored.

When the user DB (111) is updated, the question control unit (112) generates a question generation request (505) (S504). FIG. 8 illustrates data items included in the question generation request (505). The question generation request (505) includes answer history data (803) that is history data of what kind of answer the user has given so far, in addition to the user ID (601) included in the user data (503) of the user DB (111), a user ID (801) storing the user name (602), and a user name (802). In the initial dialogue processing (303), the answer history data (803) is blank, but if there is an answer obtained in another form, it may be added here.

Next, the question control unit (112) obtains a question determination model (507) from the dialogue phase determination model (116) (S506), and sends the question determination model (507) together with the user data (503) to the selective question generation unit (117). Then, the selective question generation unit (117) refers to the question determination model (507) to determine an important question that is a question to be asked next (S508), obtains selective question data (510) corresponding to the important question from the selective question DB (118), and generates question sentence data (511) (S509).

In order to describe this processing in detail, first, items included in the selective question data (510) of the selective question DB (118) are illustrated in FIG. 9. The selective question data (510) holds a question ID (901) that is an identifier of question data, a question sentence (902) that is a sentence to be presented to the user (102), and an option list (903) that is a list of options and option codes that are code values of the options in association with each other.

Next, FIG. 10 illustrates an example of the question determination model (507). The question determination model (507) in the first embodiment has a structure similar to a known decision tree, and is a combination of items of a plurality of branches (1001) (1002) and a result (1003). Each branch has elements of a branch ID (1004) that is an identifier of the branch, a question ID (1005) of a question corresponding to the branch, and an answer specific destination (1006) indicating a next branch for each answer to the question. One of the branches corresponds to one record of the selective question data (510), and the question ID (1005) of the branch and the question ID (901) of the selective question data (510) are compared, so that they can be associated with each other. In addition, the item of the result has a branch ID (907) having the same system as that of the branch and a document model ID (908) indicating the estimation result of the type of the document. The structure is a decision tree formed by stacking branches, and a result reached at an end of following the branches of the decision tree from a branch 1 (901) is the document model ID of the document model to be used.

Figure 11:
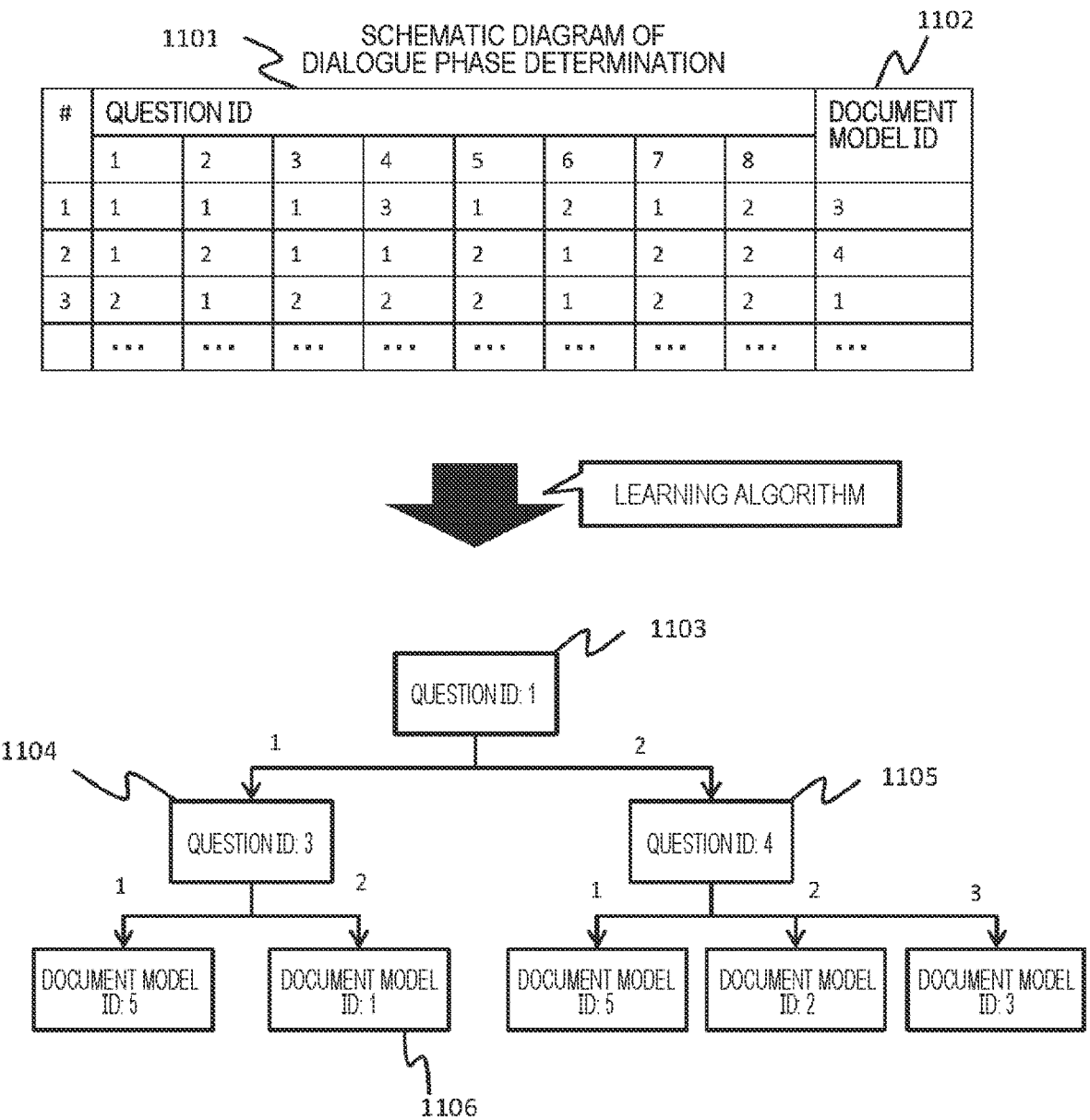
FIG. 11 is a schematic diagram of dialogue phase determination of the first embodiment.

FIG. 11 schematically illustrates a principle of identifying the document model using the question determination model (507). A table in the upper part of the figure is data on which the question determination model (507) is based. In order to create the question determination model (507), the table is obtained by collecting a large number of examples of documents to be handled by the document creation support device (101) in advance, and collecting answers corresponding to the selective question data (510) stored in the selective question DB (118) for each document. Each row in the table corresponds to each collected document. A column (1101) of the question ID corresponds to the question ID (901) of the selective question data (510), and the number filled in each column is a value of an option code in the option list (903) of the selective question data (510). In addition, a column (1102) of the document model ID is an identifier of the document model indicating which document model is suitable for each document.

The question determination model (507) can be generated by applying to the table a machine learning algorithm in which the column (1101) of the question ID is set as an explanatory variable and the column (1102) of the document model ID is set as an objective variable. A tree diagram structure in the lower part of the figure is obtained by arranging the data of the question determination model (705) in an easily viewable manner. The structure is equivalent to a structure of a known decision tree, and it is known that the structure can be constructed by learning the above table so that the column (1102) of the document model ID can be most properly sorted. A top item (1103) means the question ID of the question to be asked first, and in the case of answering with option 1, the procedure proceeds to a question (1104) on the left, and in the case of answering with option 2, the procedure proceeds to a question (1105) on the right. Therefore, in the case of answering 1 to the question with the question ID: 1 and answering 2 to the question with the question ID: 3, the document model ID: 1 (1106) is identified as the document model data to be used. When the document model can be reached by following the question determination model (507), it can be determined that it can be identified, and when it cannot be reached, it can be determined that it cannot be identified.

Note that even a model that is not the decision tree can be used as the question determination model (507) as long as it is a discriminant analysis model that predicts classification of the objective variable from the explanatory variable. Note that by using a model that can be discriminated even in a situation where the objective variable is only partially obtained, such as the decision tree, for example, a known Gaussian process method, there is an advantage that the document model can be identified without answering all questions, and as a result, the number of questions can be reduced. For example, even when the answer to the selective question cannot be obtained as the question determination model (507), the selective question generation unit (117) may estimate answers to the selective question by using the Gaussian process method, select from the selective question DB (118) a selective question to be asked next with highest reliability among the estimated answers, and reach the document model corresponding to the answer to the selected question.

The selective question generation unit (117) uses the question determination model (507) to determine the selective question to be asked next. Specifically, a branch that can be followed most deeply in the question determination model (507) is found, and a question corresponding to the question ID of the branch is set as an important question. In an example of FIG. 11, when the question with question ID: 1 is answered with 2, the important question is question ID: 4. Note that even when the model that is not the decision tree is used, it is possible to determine which question can be answered next to make it easier to identify the document model, to determine the next question. For example, when a model capable of evaluating accuracy of discrimination is used, a condition can be examined while giving an answer to the next question in a pseudo manner, and a question with highest accuracy can be set as the important question.

FIG. 12 illustrates elements of the question sentence data (511) generated from the selective question data (510). The question sentence data (511) includes a user ID (1201) of the user, a question ID (1202) that is an identifier of a question, a question type (1203) indicating a question type, a question sentence (1204) presented to the user (102), and answer information (1205) indicating an item that the user (102) should answer.

In the initial dialogue processing (303), for the elements of the question sentence data (511), the selective question generation unit (117) respectively stores the user ID (601) included in the user data (503) as the user ID (1201), the question ID (901) of the question data (510) as the question ID (1202), the code value indicating the selective question as the question type (1203), the question sentence (902) of the selective question data (510) as the question sentence (1204), and the option list (903) as the answer information (1205).

Thereafter, the input/output reception unit (110) generates the question screen (304) on the basis of the question sentence data (511) and presents the question screen (304) to the user (102) (S512). FIG. 13 illustrates an example of the question screen (304). On the screen, a question sentence (1301), a radio button input (1302) for selectively inputting an answer, and an answer button (1303) for sending an answer result are displayed. In this example, the user (102) can select an answer by the radio button input (1302) and press the answer button (1303) to send the answer. At this time, it is necessary to note that it is also necessary to hold the user ID (1201) and the question ID (1202) that are not displayed on the screen. Note that the user name (802) may be displayed on the screen (in this example, the user name "Ozawa" is used).

As described above, the initial phase ends, and thereafter, the document information collection phase is started in which the draft of the document is created by communication between the user (102) and the document creation support device (101). In the document information collection and creation phase, when the user (102) responds to the question screen (304), the document creation support device (101) repeats performing the dialogue processing (305) and generating the next question screen (304).

FIG. 14 illustrates an example of a flow of the dialogue processing (305). Similarly to the initial dialogue processing (303), the dialogue processing (305) is processing of receiving information from the user (102) and further returning a question or the like thereto. First, the input/output reception unit (110) obtains answer data (1402) that the user (102) has answered the question screen (304) (S1401). FIG. 15 illustrates an example of elements of the answer data (1402). The answer data (1402) includes a user ID (1501), a question ID (1502), and a question type (1503) similar to the user ID (1201), the question ID (1202), and the question type (1203) of the question sentence data (511) used to generate the question screen (304), and further includes an answer content (1504) that is an answer input through the question screen (304) by the user (102). In the answer content (1504), in the case of the answer to the selective question as illustrated in FIG. 13, the option code of the option selected through the radio button input (1302) or the like is written (a case where it is not a selective question will be described later). Next, the input/output reception unit (110) uses the user ID (1501) of the answer data (1402) to search the user data (503) of the user information DB (111) for a record in which the user ID (701) and the user ID (1501) of the answer data (1402) match (S1403). Thus, the record of the user data (503) corresponding to the present user (102) can be obtained.

Next, the input/output reception unit (110) sends information of the answer data (1402) to the answer record DB (113) and adds the information as answer history data (1405). The answer history data (1405) is data in which a large number of answer data (1402) are stored, and as illustrated in FIG. 16, components of the data may be the same as the answer data (1402), and a user ID (1601), a question ID (1602), a question type (1603), and an answer content (1604) respectively correspond to the user ID (1501), the question ID (1502), the question type (1503), and the answer content (1504).

When the addition to the answer history data (1104) is completed, the input/output reception unit (110) sends the information of the user data (503) to the question control unit (112). The question control unit (112) refers to the user ID (901) included in the user data (503), obtains a group of answer history data (1405) in which the user ID (1601) matches the user ID in the answer history data (1405), and performs draft creation status identification processing (S1406) that is a processing of determining a current creation status of the draft. Then, based on the result, it is determined whether the draft can be created (S1407). If the question control unit (112) determines that the draft cannot be created (S1407; No), the question control unit (112) generates the question generation request (505) (S1408), and performs question generation processing (S1409). The question generation request (505) is the same as the question generation request having elements illustrated in FIG. 8, the user ID (801) and the user name (802) can be generated by storing the user ID (701) and the user name (702) of the user data (503), and the answer history data (803) can be generated by storing a group of the answer data (1405). On the other hand, if the question control unit (112) determines that the draft can be created (S1407; Yes), the question control unit (112) generates a draft generation request (1411) (S1410), and sends it to the draft generation unit (115) to perform draft generation processing (S1412) that is processing of generating the draft. Finally, the input/output reception unit (110) receives the question sentence data (511) obtained as a result of the question generation processing (S1409) or the draft generation processing (S1412), updates the content of the user information DB (111) (S1413), and then presents the user (102) with the updated content (S1414).

FIG. 17 illustrates an example of a detailed flow of the draft generation status identification processing (S1406). In this flow, the question control unit (112) advances the processing using the user data (503) and the answer history data (1405) obtained from the answer history DB (114) (S1701). The question control unit (112) first checks the dialogue phase (703) written in the user data (503), and determines whether the "draft viewing phase" indicating a state where the draft can be created is set (S1702). If the question control unit (112) determines that the "draft viewing phase" is set (S1702; Yes), it determines that the draft can be created. If the question control unit (112) determines that the "draft viewing phase" is not set (S1702; No), it further determines whether the dialogue phase (703) is set as the "document model identification phase" (S1703). If the question control unit (112) determines that the "document model identification phase" is set (S1703; Yes), it determines that the draft cannot be created in order to indicate that which template should be used has not yet been identified (S1703). If the question control unit (112) determines that the "document model identification phase" is not set (S1703; No), it indicates that this processing is in the "document information collection phase". At this time, the user data (503) should have values stored in the document model ID (702). Thus, the question control unit (112) uses this to obtain corresponding document model data (1705) from the document model DB (114), and thus further advances the determination (S1704).

FIG. 18 illustrates data items of one record of the document model data (1705) stored in the document model DB (114). The document model data (1705) includes a document model ID (1801) that is an identifier of the record, a draft template (1802) indicating a template of a document corresponding to the document model, and a descriptive question item list (1803) having, as a list, a question ID for obtaining a keyword necessary for completing the template as the document. Note that the question ID of the descriptive question item list (1803) corresponds to an identifier used to identify a question in the selective question DB (118) and the descriptive question DB (120), and also corresponds to the question ID (1202) of the question sentence data (511), eventually the question ID (1502) of the answer data (1302). In addition, the document model ID (1801) corresponds to the document model ID (704) of the user data (503) and the document model ID (908) of the question determination model (507).

FIG. 19 illustrates a specific example of the document model data (1705) used here. In this example, a document model ID (1901) is a serial number of integer values, and there is a part described in curly braces ({ }) in a draft template (1902). An integer value is also written in the curly braces, and the integer value corresponds to the question ID. The descriptive question item list (1903) stores a list of question IDs in the curly braces appearing in the draft template (1902).

The question control unit (112) compares the document model ID (704) of the user data (503) with the document model ID (1801) of the document model data (1705), identifies a matching record, and obtains the descriptive question item list (1803). On the other hand, the answer history data (1405) also includes the answered question ID (1602). The question control unit (112) compares the two to determine whether there is a question ID that is included in the descriptive question item list (1803) and has no answer record in the answer history data (1405), that is, whether all the questions included in the descriptive question item list (1803) have been answered (S1705). If the question control unit (112) determines that all the questions included in the descriptive question item list (1803) have been answered (S1705; Yes), it determines that the draft can be created, and outputs the determination result (S1706). On the other hand, if the question control unit (112) determines that all the questions included in the descriptive question item list (1803) have not been answered (S1705; No), it determines that the draft cannot be created because there is an unanswered question, and outputs the determination result (S1707).

FIG. 20 illustrates an example of a detailed processing flow of the question generation processing (S1409) performed in the dialogue processing (305). The question generation processing (S1409) is processing of generating a question for identifying the type of the document that the user (102) is going to write or a question for asking an item necessary for completing a template of the type.

First, the question control unit (112) compares the answer history data (1405) with the question determination model (507) of the dialogue phase determination model (116) to find the document model data (1705) estimated to be currently used (S2001). This processing is performed in accordance with a principle of the question determination model (507) illustrated in FIG. 11. That is, a last result reached after following the branch of the decision tree from the branch 1 (901) matches the document model ID (1801) of the document model data (1705) to be used. The question control unit (112) can determine that the document model can be identified when the document model ID can be reached by following the question determination model (507), and determine that the document model cannot be identified when the document model ID cannot be reached.

The question control unit (112) determines whether the document model can be identified, and when the document model cannot be identified (S2002; No), the question control unit (112) causes the selective question determination unit (118) to determine the selective question to be asked next. On the other hand, when the question control unit (112) determines that the document model can be identified (S2002; Yes), the question control unit (112) causes the descriptive question determination unit (120) to generate the question sentence for obtaining information insufficient for creating the draft.

When the processing shifts to the selective question generation unit (117), the selective question generation unit (117) compares the answer history data (1405) with the question determination model (507), to determine the important question that is the question to be asked next (S2003). This processing can be performed similarly to the processing (S508) of identifying the important question in the initial dialogue processing (303). Next, the selective question generation unit (117) generates the question sentence data (511). This is also the same as the processing (S509) in the initial dialogue processing (303), and the selective question generation unit (117) obtains the selective question data (510) of the important question from the selective question DB (118) and generates the question sentence data (511) (S2004).

On the other hand, a case where it is determined that the document model can be identified, and the processing shifts to the descriptive question generation unit (119) will be described. First, the descriptive question generation unit (119) compares the answer history data (1405) with the document model data (1705), to determine the question to be asked next. Specifically, the descriptive question generation unit (119) compares the list of question IDs in the descriptive question item list (1803) of the document model data (1705) with the question ID (1602) of the answer history data (1405), and checks the question ID that is not included in the answer history data (1405) but is included in the descriptive question item list (1803). The descriptive question generation unit (119) arranges such question IDs in a predetermined order, for example, in ascending order of the question IDs, and sets a question having a smallest ID as a next important question (S2005).

Figures 21, 22:
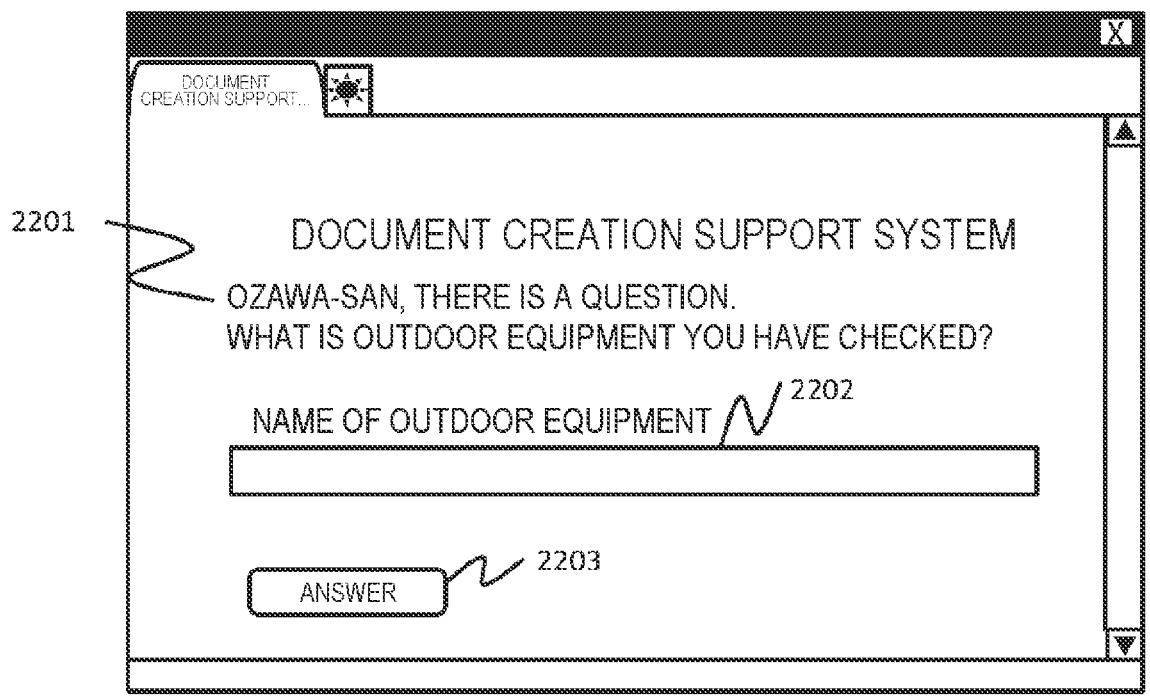
FIG. 21 is an example of descriptive question data of a descriptive question DB of the first embodiment.
FIG. 22 is an example of a question screen on a selective question of the first embodiment.

Next, the descriptive question generation unit (119) obtains descriptive question data (2007) corresponding to the question ID of the important question from the descriptive question DB (120) (S2006). FIG. 21 illustrates data of the descriptive question data (2007). The descriptive question data (2007) holds a question ID (2101) that is the identifier of the question data, a question sentence (2102) that is the sentence to be presented to the user (102), and an answer item name (2103) that is a name of an item for which an answer is requested, in association with each other. The descriptive question generation unit (119) obtains descriptive question data (2007) corresponding to the question ID of the important question, and generates the question sentence data (511). The descriptive question generation unit (119) respectively stores the user ID (701) included in the user data (503) as the user ID (1201) of the question sentence data (511), a question ID (2101) of the descriptive question data (2007) as the question ID (1202), the code value indicating the descriptive question as the question type (1203), the question sentence (2102) of the descriptive question data (2007) as the question sentence (1204), and the answer item name (2103) as the answer information (1205). Thus, the question sentence data (511) can be generated.

At the end of the question generation processing (S505), the question control unit (112) returns the question sentence data (511) to the input/output reception unit (110), together with the document model ID if the document model is identified, to end the question generation processing (S2008). Then, in (S1413) illustrated in FIG. 14, when the descriptive question generation unit (119) operates, the input/output reception unit (110) updates the dialogue phase (703) of the user data (503) as the document information collection phase and the document model ID (704) as the document model ID of the result. Note that the input/output reception unit (110) sets the dialogue phase (703) as the draft viewing phase when the draft generation unit (115) operates.

Thereafter, the input/output reception unit (110) presents the sentence to the user (102). When the question type (1203) of the question sentence data (511) is the selective question, the question screen (304) as illustrated in FIG. 13 is displayed. When the question type (1203) is the descriptive question, the question screen (304) as illustrated in FIG. 22 is displayed. The screen displays a question sentence (2201), a text box (2202) corresponding to the answer item name (2103) and allowing an answer to be input, and an answer button (2203) for sending the answer result. In this example, the user (102) can input the answer in the text box (2202) and press the answer button (2203) to send the answer. At this time, it is necessary to note that it is also necessary to hold the user ID (601) and the question ID (602) that are not displayed on the screen. Note that the user name (602) may be displayed on the screen.

Figures 23, 24:
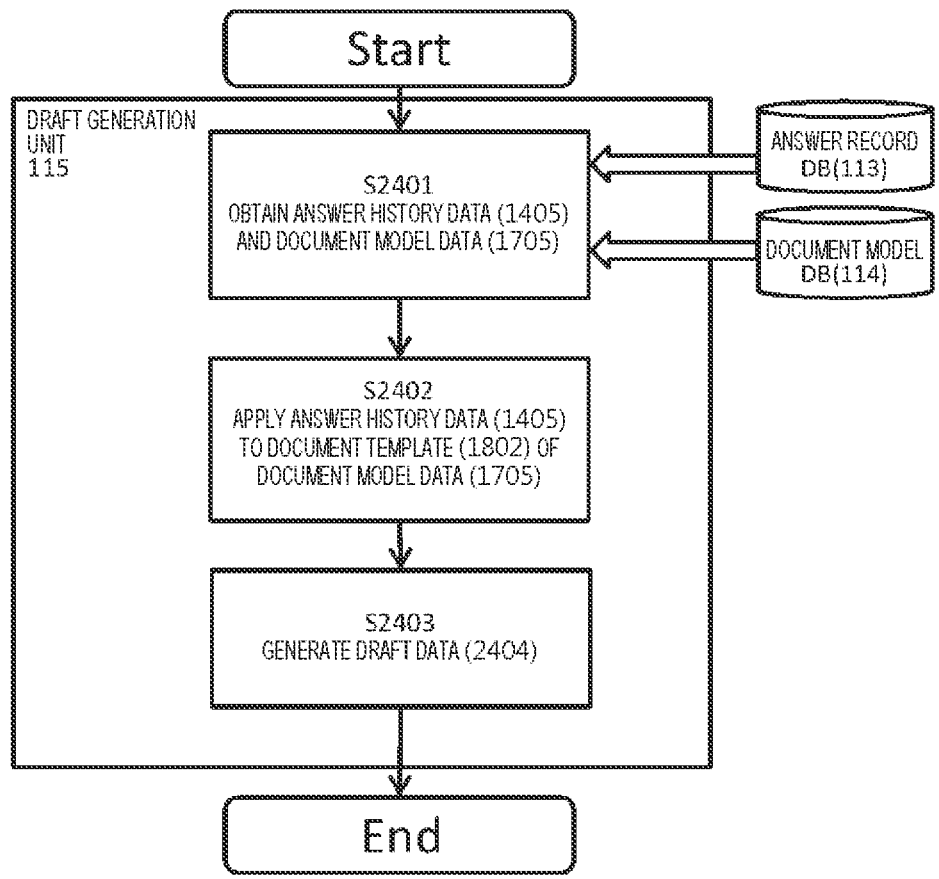
FIG. 23 is an example of a draft generation request of the first embodiment.
FIG. 24 is an example of draft generation processing of the first embodiment.

As described above, when the dialogue processing (305) in the document information collection phase is repeatedly performed, the draft creation status identification processing (S1406) in FIG. 14 eventually results in being able to create the draft. At that time, the draft generation request (1411) is sent to the draft generation unit (115), and the draft generation processing (S1412) is performed. A state in which the draft generation processing (S1412) is performed is the draft viewing phase. FIG. 23 illustrates information included in the draft generation request (1411). The draft generation request (1411) includes data of a user ID (2301) based on the user ID (701) of the user data (503), a use name (2302) based on the user name (702) of the user data (503), and a document ID (2303) identified in the dialogue processing (305).

Figures 25, 26:
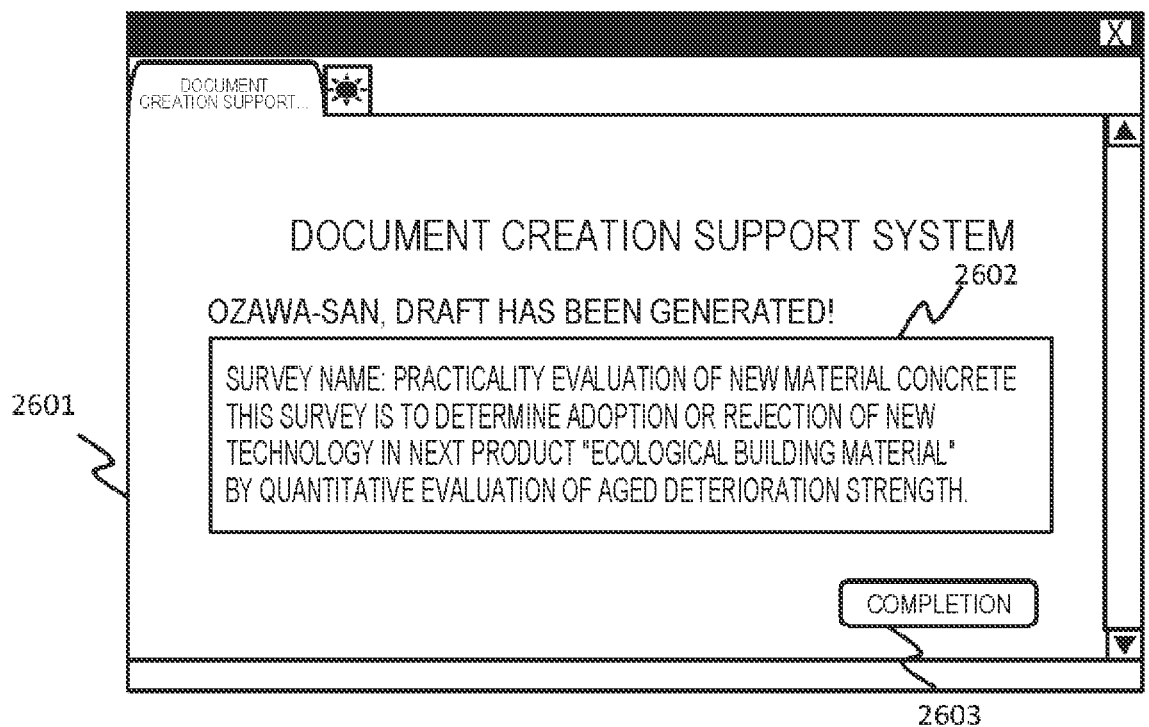
FIG. 25 is an example of draft data of the first embodiment.
FIG. 26 is an example of a draft display of the first embodiment.

FIG. 24 illustrates an example of a flow of the draft generation processing (S1412). In the draft generation processing (S1412), the draft generation unit (115) generates the draft based on the answer history data (1405) and the document model data (1705). Therefore, the draft generation unit (115) selects and obtains data with the same user ID (1601) from the answer history data (1405) of the answer record DB (113) on the basis of the user ID (2301), and obtains the document model data (1705) with the document model ID (1801) matching the document ID (2303) of the draft generation request (1411) from the document model DB (114) (S2401). Next, the draft generation unit (115) uses the document template (1802) of the obtained document model data (1705) to insert the answer content (1604) of the answer history data (1405) into a portion corresponding to the question ID in the curly braces of the template (S2402). Finally, the draft generation unit (115) generates draft data (2404) by adding information such as a user name to the extent necessary (S2403). FIG. 25 illustrates information included in the generated draft data (2404). The draft data (2404) includes a user ID (2501) based on the user ID (2301) of the draft generation request (1411), a user name (2502) similarly based on the user name (2302), and a draft text (2503) generated by processing (S2403) of completing the template.

After the draft generation processing (S1412) ends, the draft data (2404) is passed to the input/output reception unit (110) and used for generating the draft display (308). FIG. 26 illustrates an example of information presentation by the draft display (308). This screen (2601) displays a generated draft sentence (2602) and a completion button (2603) for ending the display. The displayed draft is obtained by filling necessary items in a template selected according to the user's answer, and is considered to be considerably close to a report sentence to be written by the user. When the completion button (2603) is pressed, the input/output reception unit (110) ends the screen display and generates a text file in which the draft is written. In addition, the draft may be copied and pasted by a known method.

According to the above examples, when writing a report such as an experimental investigation, it is possible to write the report in a short time without hesitation about what kind of document should be written. Although the draft is not necessarily complete, it is possible to create a report that is fully satisfactory by adding an amendment. Therefore, business workers can frequently write the report without wasting time, and loss of empirical knowledge can be suppressed.

For example, there are provided a document model determination unit (for example, the selective question generation unit 117, the question control unit 112, and S2001 in FIG. 20) that determines a document model (for example, the document model data (1705)) storing a template (for example, the draft template (1902)) of the draft to be presented to the user on the basis of the answer to the selective question and a question determination model (for example, the question determination model (507)) that determines a further question to the answer, a template application unit (for example, the descriptive question generation unit 119, the question control unit 112, (S2002, S2005, S2006, and S2008 in FIG. 20, and S1705 in FIG. 17)) that asks the descriptive question for asking a question about a content lacking in the template of the draft stored in the document model on the basis of the determined document model and the answer or an answer to the further question, and applies an answer to the descriptive question to the template of the draft, and a presentation processing unit (for example, the question control unit 112, the input/output reception unit 110, and S1412 and S1414 in FIG. 14) that presents the template of the draft, to which the answer to the descriptive question is applied, as a draft to be presented to the user, and thus it is easy to reflect information that is only in a memory of the user in the document without much effort. As a result, it is possible to frequently create reports, and it is possible to leave knowledge, that is only in a memory of the worker and is likely to be scattered and lost, as the document, and reuse the knowledge.

In addition, since the document model determination unit repeats a further question to the answer and an answer from the user to the question until the document model is determined, it is possible to accurately determine the document model suitable for the user.

In addition, since the template application unit repeats the descriptive question and an answer from the user to the descriptive question until there is no more content lacking in the template of the draft, it is possible to create the draft with high perfection.

In addition, since the document model determination unit uses the question determination model (for example, the decision tree illustrated in FIG. 10) constituted by a branch for selecting the selective question according to the answer and the answer to the further question, to determine a document model corresponding to an answer to a deepest selective question of the branch as the document model storing the template of the draft, it is possible to efficiently determine the document model to be identified.

Furthermore, the document model determination unit estimates the answers to the selective question by using the Gaussian process method, and determines the document model storing the template of the draft by using a selective question to be asked next with the highest reliability among the estimated answers, and thus even when there is a question for which the answer cannot be obtained, the document model determination unit can determine the next question for determining the document model and determine the document model.

As described above, in the present system, the question is asked in two phases of (1) a phase of identifying what knowledge is to be output by asking the selective question for identifying a knowledge model and asking a closed question along the decision tree, and (2) a phase of asking the descriptive question as a detailed question for documentation and asking a question (mainly an open question) about a detailed portion of the knowledge to be output along the identified knowledge model, and the decision tree is determined in advance by learning, so that a knowledge pattern can be identified accurately and efficiently with a small number of questions, and a load on the user can be reduced.

Second Embodiment

Figure 27:
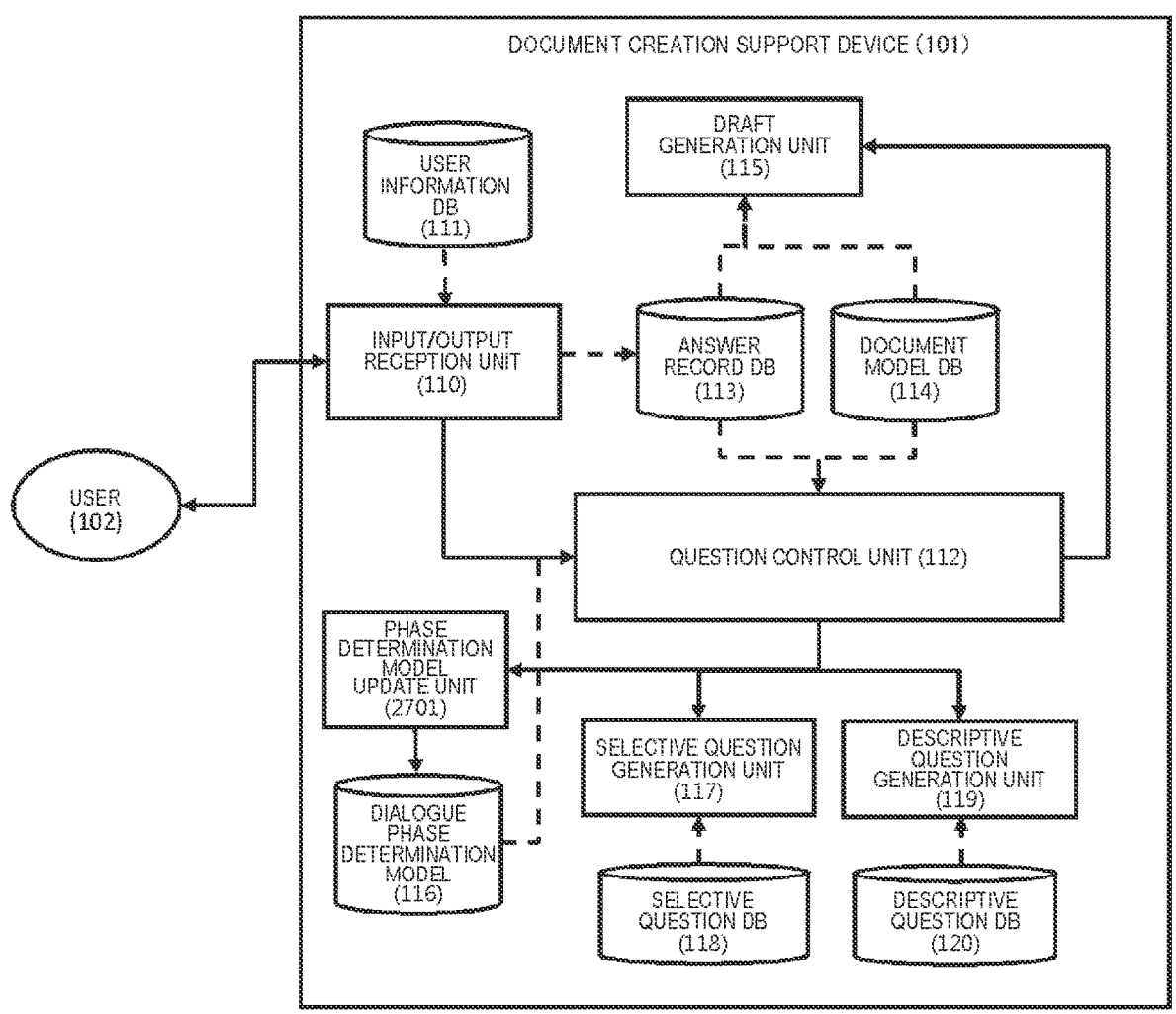
FIG. 27 is a schematic configuration example of a second embodiment.

FIG. 27 illustrates a configuration of a second embodiment of the document creation support device that is another example of the report writing support system according to the present invention. The document creation support device (101) according to the second embodiment is different from the configuration of the first embodiment in that it has a function of updating the dialogue phase determination model (116) and has a phase determination model update unit (2701). In addition, the question determination model (507) of the dialogue phase determination model (116) can be updated by the phase determination model update unit (2701).

FIG. 28 illustrates an example of a data structure of the question determination model (507). This structure is different from that of the first embodiment in a structure of result, that is, the content of a result 1 (903) in the figure. In FIG. 28, the result is not associated with one document model ID, but is associated with a plurality of document model IDs, a document ID table (2901) including a plurality of question IDs is stored, and a count table (2902) for counting the document model IDs is stored in the document ID table (2901). The count table (2902) stores a set in which the question ID, the document model ID, and a count indicating the number of times of selecting the document model are associated with each other. These elements correspond to one question.

Figure 30:
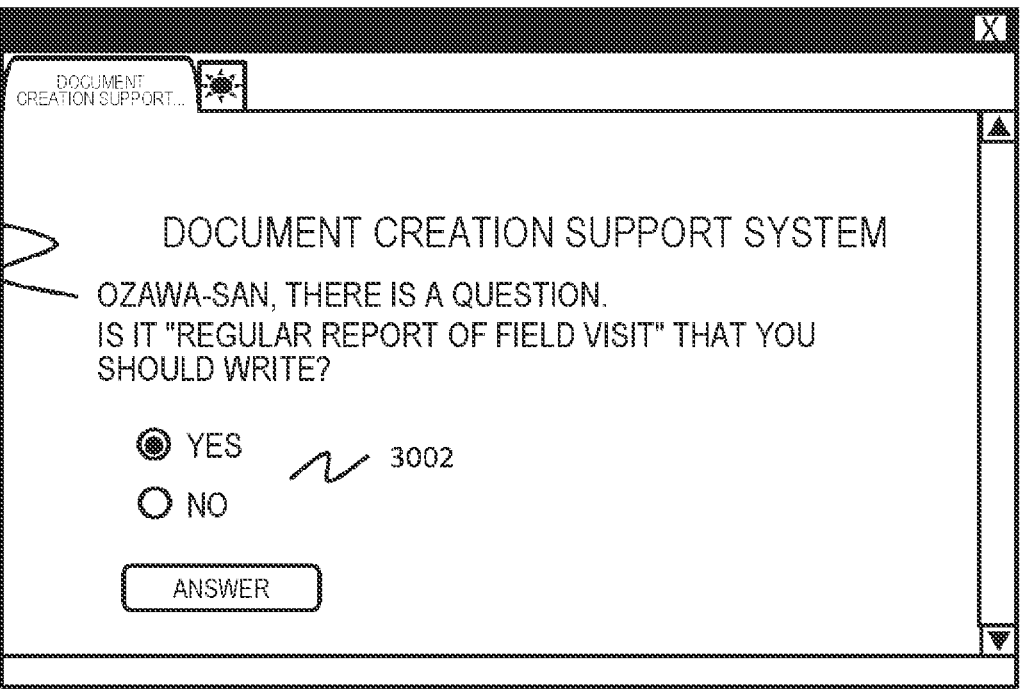
FIG. 30 is an example of a question screen on a selective question for document model determination of the second embodiment.

FIG. 29 illustrates a schematic diagram of dialogue phase determination of the second embodiment. In the decision tree for determining the dialogue phase of the second embodiment, the count table (2902) in which the question ID corresponding to each document ID and a count of the number of times of selection are associated with each other corresponds to the document ID table (2901) constituting an end of the tree. This count (2803) is also used in learning of a known decision tree, but the document creation support device (101) can generate the count by summing the number of counts for each document model ID included in data (2903) for each end of the tree to reach by following the decision tree, with respect to the data (2903) that is the basis of the question determination model (507). The question ID is associated with a question for confirming validity of each document model. If there is no data corresponding to the answer history data (1405) for any question, the question ID with the largest count (2803) is selected as the important question, and the input/output reception unit (110) displays the question screen based on the important question. FIG. 30 illustrates an example of such a question screen (304). The "regular report of field visit" in a question sentence (3001) in the figure is wording corresponding to the document model ID, and it is required to answer Yes/No (3002) to this.

Information of an answer to this question ID (2801) is recorded in the answer history data (1405) similarly to the first embodiment. In the subsequent processing of the dialogue phase determination, when the count table (2902) is reached through the same process as in the first embodiment, the document creation support device (101) checks whether there is not data corresponding to the count table (2902) in the answer history data (1405), and then if there is an answer "Yes", the document creation support device (101) uses the document model ID as a result of identifying the sentence model. If there is only "No", the document creation support device (101) sets the question having the largest count among unanswered question IDs as the next important question. With this implementation, even when the dialogue phase determination model (116) cannot correctly identify the document model, the document model can be identified.

Given the above implementation, the dialogue phase determination model (116) can be updated. FIG. 31 illustrates a processing flow of the dialogue processing (305) of the second embodiment. A difference from the first embodiment is that the dialogue phase determination model can be updated (S3101) by the phase determination model update unit (2701) after the question control unit (112) generates the question. As this update processing, the phase determination model update unit (2701) increases a count of the question ID in which "Yes" is selected by one with respect to the count table (2902) that is the end of the tree to have reached by following the decision tree, so that it is possible to ask questions in a more appropriate order. In addition, the phase determination model update unit (2701) adds the answer of the user to a table of original data (2903) to reconstruct the decision tree, so that it is possible to improve identification accuracy of the dialogue phase.

However, at the time of this update, from the viewpoint that not all the questions are answered, it is necessary to note that it is necessary to use a known algorithm that functions even in when there is a defect in the data. By using the second embodiment, it is possible to improve accuracy of a specific process of the dialogue phase, and more appropriately identify the template.

As described above, according to the system according to the second embodiment, when there are a plurality of document model candidates (for example, the count table (2902)) to be determined for the answer to the selective question or the answer to the further question, the document model determination unit presents the user with the question (for example, the question sentence (3001) illustrated in FIG. 30) to confirm validity of the document model, and determines the document model storing the template of the draft on the basis of an answer to the question presented to the user. Therefore, even when there are the plurality of document model candidates, it is possible to reliably identify the document model to be presented.

In addition, since this system includes a question determination model update unit (for example, the phase determination model update unit (2701)) that associates the document model determined by the document model determination unit with the question determination model, the identified document model can be held in an updated state.

Furthermore, since the question determination model update unit determines a document model to be associated with the question determination model according to the number of times (for example, the value of the count stored in the count table (2902)) the document model has been selected from among the plurality of document model candidates to be determined for the answer to the selective question or the answer to the further question, it is possible to identify the document model to be presented according to the number of times that the document model has been selected, that is, a frequency.

REFERENCE SIGNS LIST

101 document creation support device
110 input/output reception unit
111 user information DB
112 question control unit
113 answer record DB
114 document model DB
115 draft generation unit
116 dialogue phase determination model
117 selective question generation unit
118 selective question DB
119 descriptive question generation unit
120 descriptive question DB
507 question determination model used for determining template
701 user ID indicating identifier of user

The invention claimed is:

1. A report writing support system comprising:
a display;
a processor coupled the display; and
a memory coupled to the processor, the memory storing instructions that when executed by the processor, configure the processor to:
generate a question determination model by applying a machine learning algorithm to a table, to generate a decision tree having branches indicated by answers to questions, the table having a plurality of rows respectively indicating document identifications (IDs) of document models and having a plurality of columns indicating question IDs respectively indicating the questions,
determine a document model that stores a template of a draft to be presented to a user, the document model is determined based on executing the generated question determination model, by presenting the questions of the question determination model and receiving answers to arrive at a respective document model,
display further questions about a content lacking in the template of the draft stored in the determined document model and the answer or an answer to a next question, and apply an answer to the descriptive question to the template of the draft, and
present the template of the draft, to which the answer to the descriptive question is applied, as the draft to be presented to the user.

2. The report writing support system according to claim 1, wherein the processor is configured to, during execution of the generated question determination model, display the questions of the decision tree on the display according to the answers received until the document model is determined.

3. The report writing support system according to claim 1, wherein the processor is configured to repeatedly display the descriptive question and an answer from the user to the descriptive question until there is no more content lacking in the template of the draft.

4. The report writing support system according to claim 1, wherein the processor is configured to estimate answers to the selective question by using a Gaussian process method, and determine the document model storing the template of the draft by using a selective question to be asked next with a highest reliability among the estimated answers.

5. The report writing support system according to claim 1, wherein the processor is configured to display a question to confirm a validity of the document model.

6. The report writing support system according to claim 1, wherein the processor is configured to determine the document model to be associated with the question determination model according to a number of times a document model has been selected from among a plurality of document model candidates to be determined for the answer to the selective question or the answer to a next question.

7. A report writing support method, comprising:

generating a question determination model by applying a machine learning algorithm to a table, to generate a decision tree having branches indicated by answers to questions, the table having a plurality of rows respectively indicating document identifications (IDs) of document models and having a plurality of columns indicating question IDs respectively indicating the questions;

determining, a document model that stores a template of a draft to be presented to a user, the document model is determined based on executing the generated by presenting the questions of the question determination model and receiving answers to arrive at a respective document model;

display further questions about a content lacking in the template of the draft stored in the determined document model and the answer or an answer to a next question, and applying an answer to the descriptive question to the template of the draft; and displaying the template of the draft, to which the answer to the descriptive question is applied, as a draft to be presented to the user.

* * * * *